(12) United States Patent
Al-hemyari et al.

(10) Patent No.: US 6,571,039 B1
(45) Date of Patent: May 27, 2003

(54) OPTICAL WAVEGUIDE HAVING A WEAKLY-CONFINING WAVEGUIDE SECTION AND A STRONGLY-CONFINING WAVEGUIDE SECTION OPTICALLY COUPLED BY A TAPERED NECK

(75) Inventors: Kadhair Al-hemyari, Northville, MI (US); Christopher T. Youtsey, Farmington Hills, MI (US)

(73) Assignee: LNL Technologies, Inc., Cambridge, MA (US)

( * ) Notice: Subject to any disclaimer, the term of this patent is extended or adjusted under 35 U.S.C. 154(b) by 0 days.

(21) Appl. No.: 09/718,954

(22) Filed: Nov. 22, 2000

Related U.S. Application Data

(60) Provisional application No. 60/167,141, filed on Nov. 23, 1999.

(51) Int. Cl.[7] .................................................. G02B 6/26
(52) U.S. Cl. ........................ 385/43; 385/14; 385/131; 385/132
(58) Field of Search ............................... 385/14, 28–32, 385/37, 123, 40–43, 50, 51, 130–132

(56) References Cited

U.S. PATENT DOCUMENTS 5,761,364 A * 6/1998 Knapp et al. .............. 385/43 X
6,229,947 B1 * 5/2001 Vawter et al. .............. 385/130
6,324,326 B1 * 11/2001 Dejneka et al. ........... 385/43 X

* cited by examiner

Primary Examiner—Phan T. H. Palmer
(74) Attorney, Agent, or Firm—Edwards & Angell, LLP

(57) ABSTRACT

An optical waveguide includes a first waveguide section providing weak confinement of an optical signal in a direction generally transverse to its propagation direction, a second waveguide section providing strong confinement of the optical signal in all directions relative to the propagation direction, a tapered neck between the first and second waveguide sections to optically couple those waveguide sections, and a core defined through the first and second waveguide sections and tapered neck, and through which the optical signal may propagate in the propagation direction. A method for making such an optical waveguide.

12 Claims, 3 Drawing Sheets

OPTICAL WAVEGUIDE HAVING A WEAKLY-CONFINING WAVEGUIDE SECTION AND A STRONGLY-CONFINING WAVEGUIDE SECTION OPTICALLY COUPLED BY A TAPERED NECK

CROSS-REFERENCE TO RELATED APPLICATION

This application claims priority to Provisional Patent Application No. 60/167,141, filed on Nov. 23, 1999.

FIELD OF THE INVENTION

The present invention is directed to an optical waveguide that provides both weak and strong photon confinement in a unitarily formed waveguide device.

BACKGROUND OF THE INVENTION

Optical data transmission offers various advantages over other forms of data transmission, primarily with regard to bandwidth and size of the transmission medium (e.g., fiber-optic cables, waveguides, etc.). Additionally, recent developments have made more attractive the fabrication of integrated optical devices suitable for use in optical data transmission systems. Examples of such developments can be found in U.S. Pat. Nos. 5,790,583; 5,825,799; 5,878,070; 5,926,496; and 6,009,115, the contents of each of which are incorporated by reference herein. Those references describe various optical devices such as lasers, resonators and wayeguides, which are well-suited for use in construct ing data and telecommunication optical networks.

Heretofore optical networks have routed or otherwise controlled the transmission of light (i.e., of an optical signal) by converting the light signal into an electrical signal, manipulating the converted electrical signal using electronic components, and then converting the electrical signal back into a light signal. Such conversion-intensive signal processing is, however, undesirable because it slows and complicates data flow.

It is therefore desirable, whenever a light signal is to be manipulated, to avoid converting light signals to electrical signals. Rather, it is preferable to instead use optical devices to manipulate the light signal directly, and thereby simplify and speed operation of the optical network. Eliminating many of the electronic components from optical networks also facilitates the integration of very small (i.e., nanometer scale) optical components in the optical networks. In some cases such optical components may comprise a plurality of integrated devices formed on a single substrate much in the same manner as the integrated electrical semiconductor devices which are today in widespread use.

The waveguides currently used in optical networking may vary in their size and construction because different waveguide configurations are preferred for different uses. A new generation of optical waveguide devices now employed in optical data systems uses nanostructure (i.e., nanometer scale) deeply etched waveguides to control light pulses. Such nanostructure deeply etched waveguides strongly confine the light transmitted therein, and offer benefits such as reduced overall linear insertion losses, and maximized optical power coupling efficiency into the nanostructure waveguides. Other optical components may include waveguides which weakly confine the light transmitted therethrough, such as, for example, shallow etched waveguides. By way of example, conventional shallow etched waveguides transmit light efficiently and so are suited for use whenever light is to be sent a substantial distance.

For various reasons dictated by the laws of optics, it is eventually preferable to transmit an optical signal through weakly-confining, rather than strongly-confining waveguides. Such weakly-confining waveguides are known, and may be generally characterized as two-dimensional strip waveguides. Weakly-confining waveguides typically have a core width of at least 2 $\mu$m. In contrast, strongly-confining waveguides may be deeply etched and have a width of not more than 1 $\mu$m. The deeply-etched structure of such waveguides minimizes leakage of optical power carried by the tail of the guided mode into the substrate.

Although nanostructure optical devices employ nanostructure deeply etched waveguides, the light pulses eventually will, because of signal transmission issues, pass into weakly-confining conventional shallow etched waveguides, which have lower propagation losses than strongly-confining waveguides. Such weakly-confining waveguides may take the form of shallow etched waveguides and are preferable for transmission of light pulses because they are single mode, and because they are relatively easy to fabricate. Arranging for the efficient passage of light between the two types of waveguides is, however, difficult. For example, light transmitted between weakly-confining and strongly-confining waveguides will be subject to losses, such as reflection loss, which occurs when light propagates from one waveguide to another.

Although light can be transferred from a conventional weakly-confining strip waveguide to a nanostructure deeply etched waveguide at a butt joint, such a connection is undesirable because it is subject to losses. The small cross-section of the nanostructure deeply etched waveguide makes its coupling efficiency to the conventional weakly-confining strip waveguide poor. This occurs because the required deep etch of the nanostructure strongly-confining waveguide makes such a structure multi-mode, while the weakly-confining waveguide is single-mode. This means that a significant part of the coupled optical power transmitted into these sections will be carried by the higher order modes and will be radiated when it arrives at the devices which are served by the nanostructure deeply etched waveguide. This effect increases the linear insertion loss of such devices.

The term "waveguide" will be understood by those skilled in the art to refer to optical components having a core of material surrounded by cladding, with both the core and cladding being transparent to light and having a respective index of refraction. The core may be a buried structure, in which case it is completely surrounded by cladding. Alternative, the core may be a ridge or strip structure, in which case it is partially surrounded by cladding, and partially surrounded by another medium such as, for example, air or a vacuum having respective index of refraction.

To "strongly-confine" generally refers to a difference in refractive indices ($\Delta n$) between the waveguide core, cladding, and surrounding medium (if provided) of at least a particular amount. To "weakly-confine" refers to a waveguide in which the difference in refractive indices between the waveguide core, cladding, and surrounding medium (if provided) is less than that particular amount.

A waveguide may be a photonic-wire waveguide, which provides a waveguide core surrounded in all directions transverse to photon propagation direction, such as, for example, both in a width and thickness direction, by a relatively low refractive index (compared with the core) medium such as air, silica, or other relatively low refractive index material, to provided strong photon confinement in all directions perpendicular to their propagation direction in and through the waveguide core. A waveguide may also be a photonic-well waveguide, which provides a waveguide core surrounded on opposite sides in a direction transverse to photon propagation direction, such as, for example, in a width direction, by a relatively low refractive index medium or material, to provide strong photon confinement in a direction perpendicular to their propagation direction in and through the waveguide core.

Thus, there exists a need in the art for an optical component that overcomes the above-described shortcomings of the prior art. In particular, there is a need for devices which increase the coupling efficiency between weakly-confining and strongly-confining waveguides, and which reduce insertion losses at such junctions by decreasing the scattering loss from the side walls of the input and output sections which is due to a shallow etch.

SUMMARY OF THE INVENTION

The present invention is directed to a novel waveguide structure that provides, in a unitarily formed waveguide, weak photon confinement and strong photon confinement along a propagation direction defined by a core through the waveguide.

In an embodiment of the present invention, an optical waveguide through which an optical signal may propagate in a propagation direction and along an optical path comprises a first waveguide section providing weak confinement of the optical signal in a direction generally transverse to the propagation direction and a second waveguide section providing strong confinement of the optical signal in all directions relative to the propagation direction. A tapered neck is provided between the first and said second waveguide sections and a core is defined through the first and second waveguide sections and the tapered neck, and through which the optical signal may propagate in the propagation direction.

The present invention is also directed to a method of fabricating a waveguide having a weakly-confining waveguide section and a strongly-confining waveguide section optically coupled by a neck that simultaneously tapers in two directions.

The invention accordingly comprises the features of construction, combination of elements, and arrangement of parts which will be exemplified in the disclosure herein. The scope of the invention will be indicated in the claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The terms "light signal" and "optical signal" are used interchangeably herein. The term "light" as used herein should be construed in the broadest possible sense, and is intended to include visible electromagnetic radiation, as well as infrared and ultraviolet radiation.

The present invention is especially suited for use with waveguides which are formed on integral planar optical substrates. In such waveguides the cladding may be formed as a single layer surrounding the core or, because of manufacturing concerns, may constitute an upper and lower cladding layer which together enclose the core. Owing to the core's greater refractive index, light propagates through and along the core, even though there may be curves in the waveguide.

Figure 1:
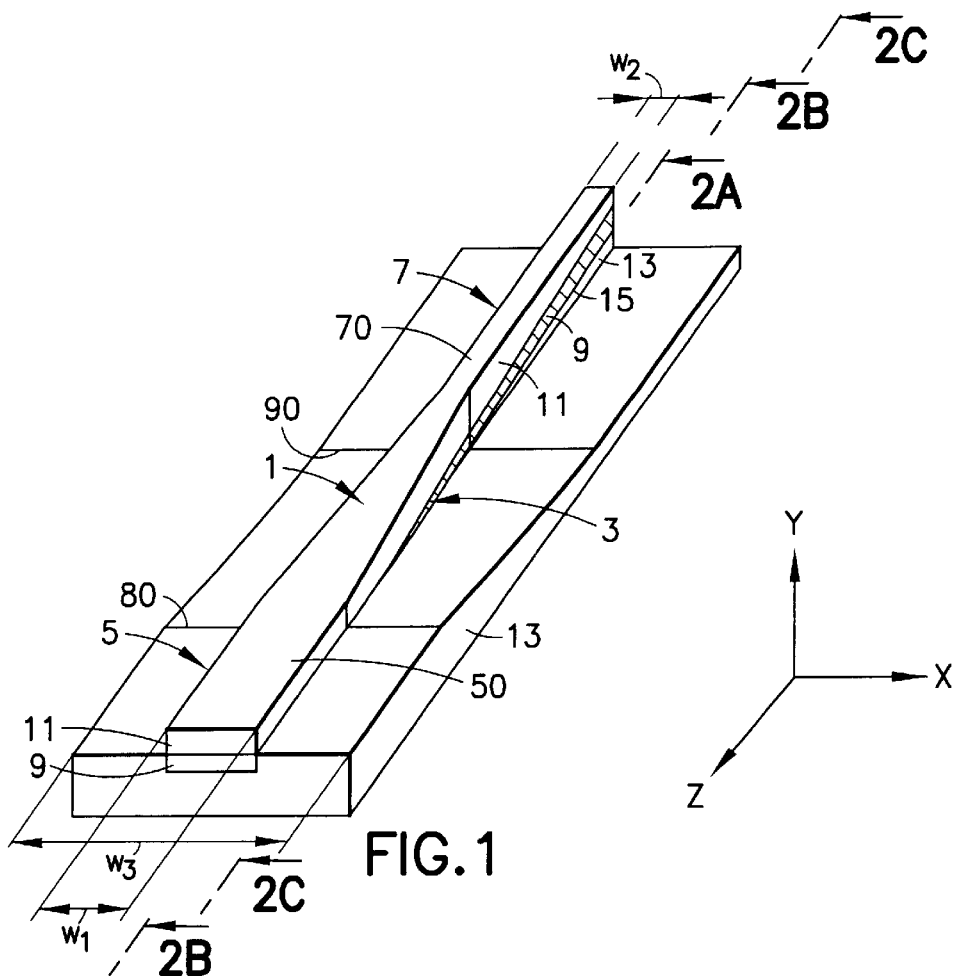
FIG. 1 is a perspective view of a waveguide constructed in accordance with an embodiment of the present invention.

It is often desirable to transmit light between weakly-confining and strongly confining waveguides, with the light generally propagating from the strongly-confining waveguide to the weakly-confining waveguide. This, however, entails substantial optical losses due to the joints required to optically couple the different waveguides. The present invention reduces such optical losses by providing a novel waveguide 1 having a first waveguide section 5 that provides weak photon confinement (i.e., weakly-confining) and a second waveguide section 7 that provides strong photon confinement (i.e., strongly-confining), coupled to each other by a neck 3 that simultaneously tapers in two directions (i.e., a bi-tapered neck), as depicted in FIG. 1. While FIG. 1 generally depicts a ridge or strip waveguide, other waveguide structures and configurations are contemplated by and within the scope and spirit of the present invention.

A smooth transition between the waveguide sections 5, 7 is provided by the tapered neck 3 that confines the light traveling through the waveguide 1 between these first and second waveguide sections 5, 7 in accordance with known principals of waveguide optics and greatly reduces the transition loss which would otherwise occur where light passes between waveguides having different dimensions.

As shown in FIGS. 1 and 2A–2C, a core 9 having an index of refraction, $n_c$, is disposed through the waveguide 1, including through both waveguide sections 5, 7, and defines an optical path and propagation direction (generally along the Z-axis) for an optical signal transmitted through the waveguide 1. The core 9 may be disposed between a cladding layer 11 having an index of refraction, $n_{c1}$, and substrate 13 having an index of refraction, $n_s$, or between top and bottom cladding layers (not shown). The waveguide 1 has a width, $w_3$. In the weakly-confining;waveguide section 5, a ridge 50 having a width $w_1$ is provided in order to cover the core 9 disposed atop the substrate 13. In the strongly-confining waveguide section 7, a ridge 70 has a width $w_2$ and the core 9 has substantially the same width. This ridge 70 covers core 9 disposed atop the substrate 13.

The core 9 of the weakly-confining waveguide section 5 is surrounded above by the cladding 11 and below by the substrate 13, thus providing weak photon confinement along the propagation direction. In the strongly-confining waveguide section 7, the cladding 11, core 9 and substrate 13 have been etched away in both the x and y directions so that the cladding 11, core 9 and a portion of the underlying substrate 13 are all the same width, $w_2$, and the core 9 is exposed along its lateral edges 15 to air, for example. Since the refractive index of air is approximately equal to 1.00, strong photon confinement in the core 9 is thus provided along the propagation direction in that waveguide section 7.

One feature of this invention is the use of a tapered neck 3 which joins weakly- and strongly-confining waveguide sections 5, 7. Preferably, this tapered neck 3 is bi-tapered, meaning that it simultaneously tapers along its length in both width and thickness; more specifically, the tapered neck 3 decreases in width and increases in thickness, or increases in width and decreases in thickness, depending upon which direction the neck length is being considered. Typically the tapered neck 3 has a length, $l_1$, (see, e.g., FIG. 2C), and varies in width and thickness along its length where it meets the weakly-confining waveguide section 5, generally designated as 80 in FIG. 2C, to where it meets the strongly-confining waveguide section 7, generally designated as 90 in FIG. 2C.

Various rates of taper could be used, depending upon the particular considerations of a given installation. One or both of the taper rates (i.e., width and/or thickness) could be constant or variable. By way of example, the taper rate may be higher near the strongly-confining waveguide section 7 than near the weakly-confining waveguide section 5. Conversely, the taper rate may be higher near the weakly-confining waveguide section 5 than near the strongly-confining waveguide section 7.

By virtue of the tapered neck 3, optical signals can pass from the weakly-confining waveguide section 5 to the strongly-confined waveguide section 7 without any abrupt transition. By avoiding any abrupt transition, unwanted reflections and other losses in the optical signal as it passes between the two different waveguide sections 5, 7 can be avoided.

The tapered neck 3 provides a gradual simultaneous transition in both waveguide width and thickness between the weakly-confining and strongly-confining waveguide sections 5, 7. Thus, tapered neck 3 can be referred to as "bi-tapered". The two dimensional taper of the neck 3 is provided by selective removal of the cladding 11, core 9 and substrate 13 layers in both the x and y directions (see, e.g., FIG. 1) so that, when viewed in partial cross-section, as in FIGS. 1 and 2C, the core 9 is gradually exposed as the width of the waveguide 1 changes (i.e., decreases). The changing width of the neck 3 may also be clearly seen in FIG. 2D. Progressing from the weakly-confining waveguide-section 5 to the strongly-confining waveguide section 7, the width of the ridge 50, 70 decreases from a first dimension, $w_1$, to a second dimension, $w_2$. At the same time, the cladding 11 is removed, as depicted in FIG. 2C, until the core 9 is exposed. Continuing toward the strongly-confining waveguide section 7, part of substrate 13 is also removed until at a predetermined point the amount of substrate 13 removed is kept constant.

Figure 2A:
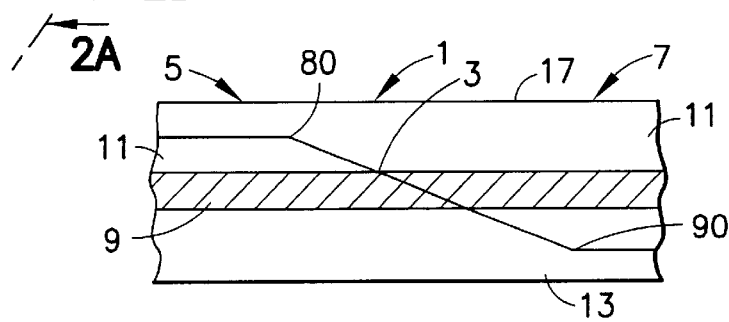
FIG. 2A is a cross-sectional view taken along line 2A—2A of FIG. 1.
Figure 2B:
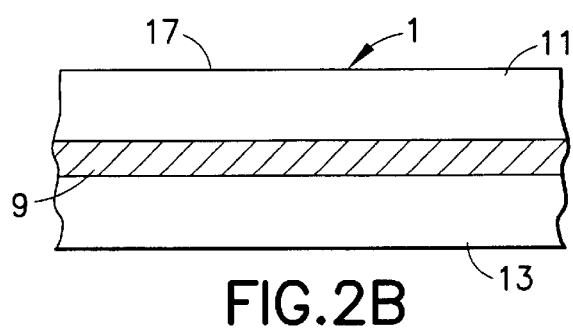
FIG. 2B is a cross-sectional view taken along line 2B—2B of FIG. 1.
Figure 2C:
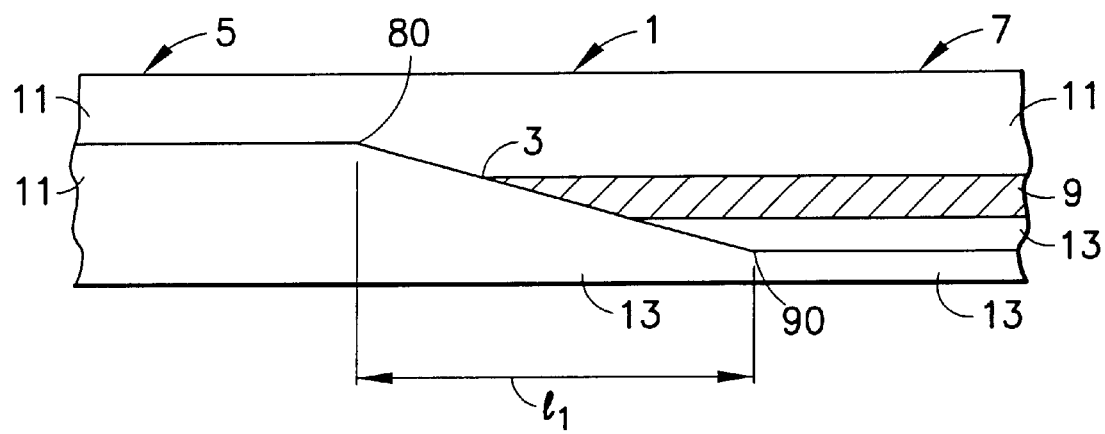
FIG. 2C is a cross-sectional view taken along line 2C—2C of FIG. 1.
Figure 2D:
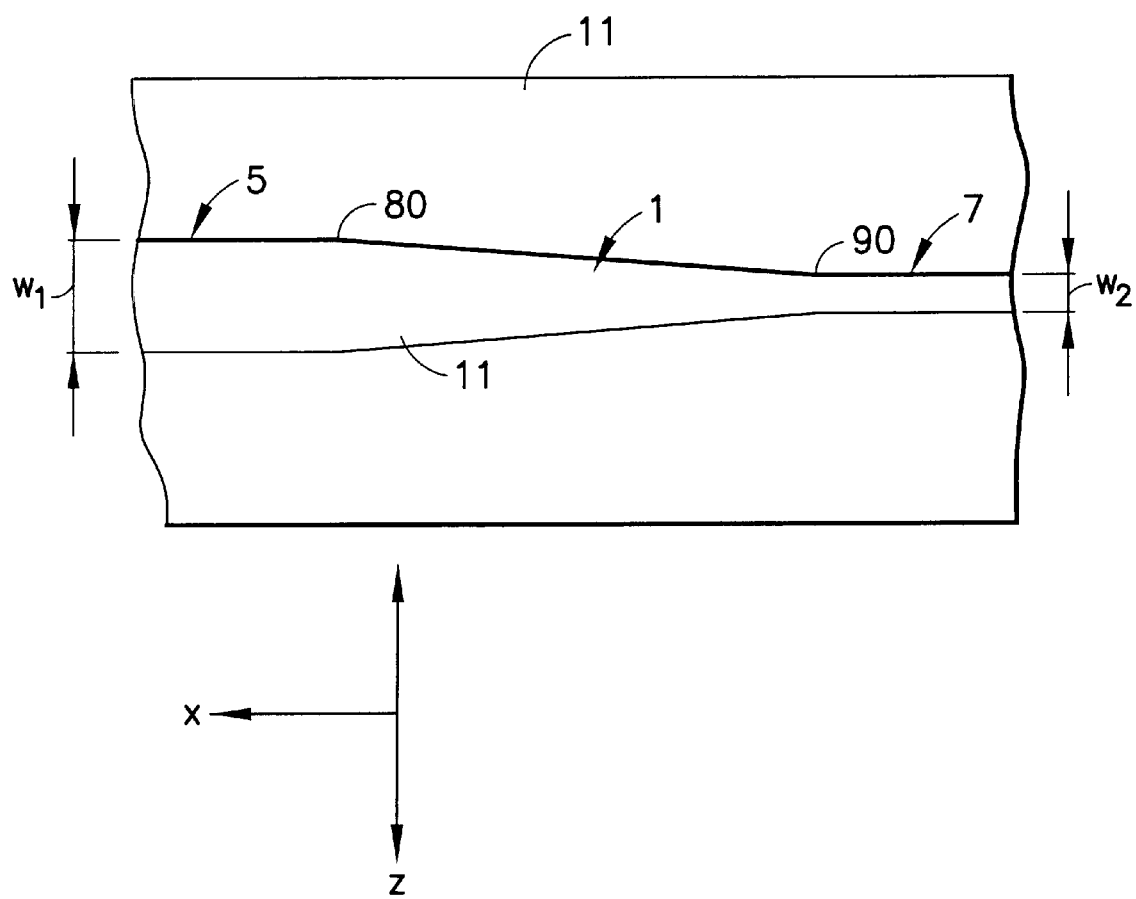
FIG. 2D is a top plan view of the waveguide of FIG. 1.

When seen from above as in FIG. 2D, the present invention provides a waveguide 1 having a weakly-confining waveguide section 5 coupled to a tapered neck 3, which is coupled to a strongly-confining waveguide section 7. The tapered neck 3 has a length, $l_1$, that is defined by the distance between the location at which the waveguide section 5 couples to the tapered neck 3, indicated as 80, and the location at which the tapered neck 3 couples to the waveguide section 7, indicated as 90.

When the inventive waveguide 1 is viewed from the side, as shown in FIGS. 2A and 2B, it can be seen that the top surface 17 of the cladding 11 remains level for the entire length of the waveguide 1, whereas as one progresses from the weakly-confining to the strongly-confining waveguides 5,7, increasing amounts of the cladding 11, then the core 9, and finally some of the substrate 13 are removed, until at some point no further substrate is removed, gradually exposing the core 9.

At least with regard to the strongly-confining waveguide section 7 of the waveguide 1, the core 9 can be rectangular, with sides running from approximately 3–10 µm thick and approximately 3–15 µm wide. More preferably, the core 9 is square, with sides from approximately 6–8 µm thick and approximately 6–14 µm wide. The cladding layer 13 covering core 9 can be approximately 3–18 µm thick, and is preferably approximately 15 µm thick, as can be any cladding layer lying beneath core 9. While a wide variety of materials can be used to make the core and cladding layers, silica is presently preferred.

It is preferable that at least one of the weakly-confining and strongly-confining waveguide sections 5 and 7 be single-mode waveguides. Those skilled in the art will appreciate that single-mode waveguides can be formed through the choice of suitable waveguide material and dimensions, and so a detailed discussion of these aspects of the invention is not believed to be needed.

Figure 4:
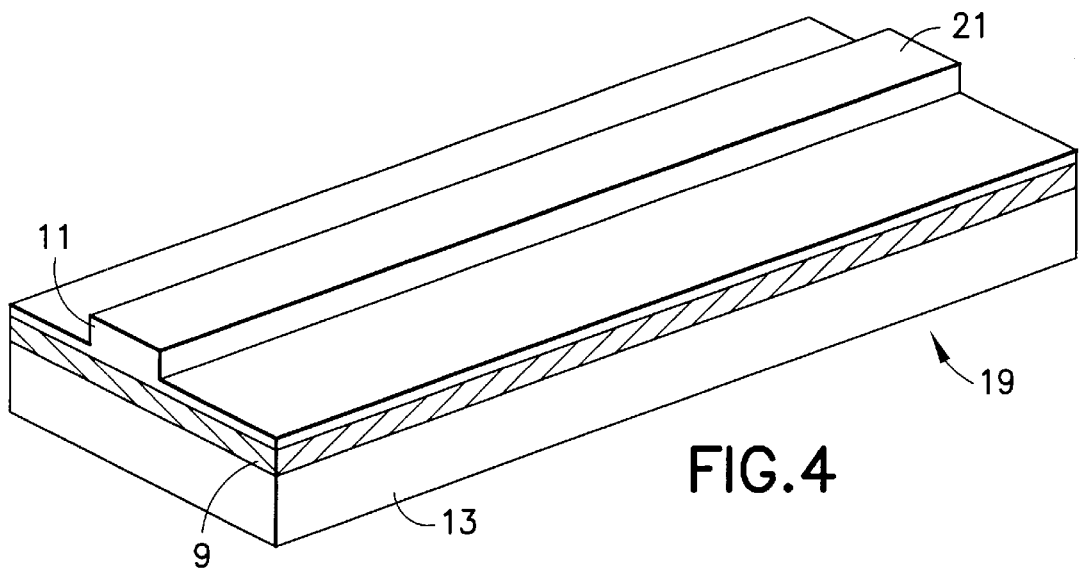
FIG. 4 is a perspective view showing one suitable blank of material, prior to processing, that can be used to obtain a waveguide in accordance with the present invention.

Preferably the bi-tapered neck 3 and waveguide 1 of the present invention may be fabricated using gray-scale photolithographic masking and e-beam exposure techniques. Other now known and hereafter developed semiconductor fabrication and processing techniques may also be suitable for fabricating a waveguide in accordance with the present invention, and as such, are contemplated by and within the scope and spirit of the present invention. The method of the present invention begins by providing a blank 19 of general shape as shown in FIG. 4. The blank 19 has a uniform cross-sectional profile which is generally the same as the cross-sectional profile of the weakly-confining waveguide section 5 of the waveguide 1 depicted in FIG. 1. Thus, the blank 19 has on its top surface a ridge 21 formed from the cladding material 11 and which runs the full length of the blank 19.

Figure 3A:
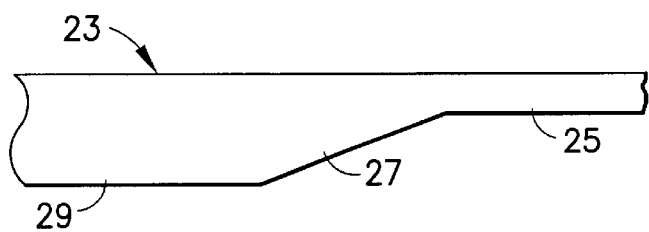
FIGS. 3A and 3B are a side cross-sectional view and a perspective view of a variable thickness mask suitable for use in a method of fabricating a waveguide in accordance with the present invention.
Figure 3B:
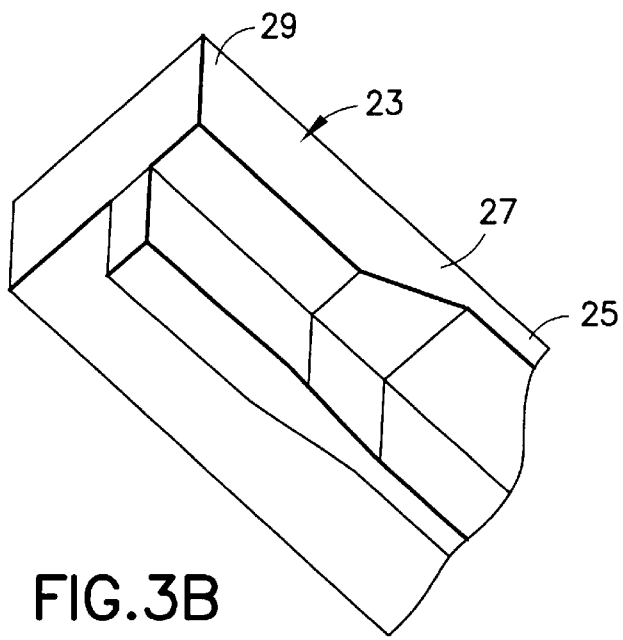

The blank 19 is selectively etched to achieve the desired profile in a suitable plasma etching chamber. The blank 19, along with an overlying gray-scale mask 23 (see, e.g., FIGS. 3A and 3B) patterned as described below, is placed into the plasma chamber. Gaseous etchants are introduced into the plasma chamber, where they are ionized. The gray-scale mask 23 lying atop the blank 19 is thin in areas 25 where a high degree of etching is desired, thick in areas 27 where little etching is needed, and thickest 29 where the least (or no) etching is desired (there is a mask thickness above which no etching occurs).

The tapered neck 3 structure may also be formed in a variety of other ways, for example, by performing multiple etching steps. Thus, the present invention is not limited to the procedures which have been described.

The present invention is not limited to any particular semiconductor materials, and may use any materials which possess the requisite optical and physical properties. Presently it is believed that silica-based ($SiO_2$) materials are preferable. In particular, the core 9 might be germanium oxide doped silica deposited atop a silicon substrate 13 (this forming the lower portion of the cladding), with the rest of the cladding being boron-phosphide doped silica glass. Also by way of example, a quartz substrate could be used. Other materials which could be used for the core 9 include indium phosphide, and/or gallium arsenide, and the cladding 11 could be made with indium phosphide, gallium arsenide, aluminum oxide, silicon nitride and/or polymers, or some combination thereof.

It should be understood that this invention is not intended to be limited to the angles, materials, shapes or sizes portrayed above, save to the extent that such angles, materials, shapes or sizes are so limited by the express language of the claims.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween. In particular, this invention should not be construed as being limited to the dimensions, proportions or arrangements disclosed herein.

What is claimed is:

1. An optical waveguide through which an optical signal may propagate in a propagation direction and along an optical path, said waveguide comprising:

a first waveguide section providing weak confinement of the optical signal in a direction generally transverse to the propagation direction;

a second waveguide section providing strong confinement of the optical signal in all directions relative to the propagation direction;

a tapered neck between said first and said second waveguide sections to optically couple said first and said second waveguide sections; and a core defined through said first and said second waveguide sections, said tapered neck, and through which the optical signal may propagate in the propagation direction.

2. A waveguide according to claim 1, wherein said tappered neck has a width that appears at a first rate.

3. A waveguide according to claim 2, wherein said tapered neck has a thickness that tapers at a second rate.

4. A waveguide according to claim 3, wherein said first and said second rates are substantially constant.

5. A waveguide according to claim 1, wherein said first waveguide section is at least approximately 2 $\mu$m wide.

6. A waveguide according to claim 1, wherein said second waveguide section is not more than approximately 1 $\mu$m wide.

7. A waveguide according to claim 1, wherein said tapered neck simultaneously tapers in both a width and a thickness.

8. A waveguide according to claim 1, wherein said first waveguide section is a strip waveguide.

9. A waveguide according to claim 1, wherein said second waveguide section is a strip waveguide.

10. A waveguide according to claim 1, wherein said tapered neck had a width, a thickness, and a length, wherein said width decreases as said thickness increases over said length.

11. A waveguide according to claim 1, wherein at least one of said first and said second waveguide sections is a single-mode waveguide.

12. A waveguide according to claim 1, wherein said first waveguide section, said second waveguide section, and said tapered neck are unitarily formed on a substrate.

\* \* \* \* \*